US005117962A

United States Patent [19]

Tommarello et al.

[11] Patent Number: 5,117,962

[45] Date of Patent: Jun. 2, 1992

[54] SCREENING MACHINE SYSTEM

[75] Inventors: Domenic A. Tommarello; Joseph E. Lioi, Jr.; James C. Tommarello, all of Pittsburgh, Pa.

[73] Assignee: Contraves U.S.A., Inc., Pittsburgh, Pa.

[21] Appl. No.: 558,088

[22] Filed: Jul. 25, 1990

[51] Int. Cl.[5] .............................................. B65G 29/00

[52] U.S. Cl. .................................... 198/378; 198/379; 198/803.5

[58] Field of Search ............ 198/377, 378, 379, 470.1, 198/471.1, 803.5, 341

[56] References Cited

U.S. PATENT DOCUMENTS

| | | | |
|---|---|---|---|
| 1,582,679 | 4/1926 | Greer | 198/379 X |
| 2,415,997 | 2/1947 | Eldsed | 198/470.1 X |
| 2,417,472 | 3/1947 | Dorff | 198/377 X |
| 2,727,828 | 12/1955 | Law | 117/33.5 |
| 2,763,565 | 9/1956 | McKenzie et al. | 117/8 |
| 2,769,733 | 11/1956 | Pool | 117/211 |
| 2,770,557 | 11/1956 | Atti | 117/33.5 |
| 2,813,505 | 11/1957 | Eirinberg | 198/377 X |
| 2,927,679 | 3/1960 | Rively | 198/378 X |
| 2,967,783 | 1/1961 | Shinal | 117/34 |
| 3,319,759 | 5/1967 | Hajduk et al. | 198/378 |
| 3,364,054 | 1/1968 | Weingarten | 117/33.5 |
| 3,376,153 | 4/1968 | Fiore | 117/33.5 |
| 3,479,711 | 11/1969 | Heil | 29/25.13 |
| 3,832,211 | 8/1974 | Cook et al. | 117/33.5 C |
| 3,992,245 | 11/1976 | Franklin | 198/803.5 X |
| 4,615,719 | 10/1986 | Pauluk et al. | 198/341 X |
| 4,880,100 | 11/1989 | Tweedy et al. | 198/379 |

FOREIGN PATENT DOCUMENTS

| | | | |
|---|---|---|---|
| 2370660 | 6/1978 | France | 198/803.5 |

*Primary Examiner*—Robert P. Olszewski
*Assistant Examiner*—James R. Bidwell
*Attorney, Agent, or Firm*—John M. Adams

[57] ABSTRACT

A plurality of screening stations are arranged in a circular array around a continuous conveyor for advancing in step-by-step fashion a plurality of modules from station to station. A module is provided for each station and includes a holder for receiving and securing in place a glass panel for photoprocessing red, blue, and green pixels on each glass panel in the fabrication of a cathode ray tube. The glass panels are supported on each module for rotational and angular movement controlled by a drive mechanism housed on each module. A controller for initiating programmed motion of the glass panel operates the drive mechanism of each module in response to the actuation of selected magnetic switches corresponding to the operations to be performed at a specific station. The magnetic switches are actuated upon the detection of a glass panel on a module and the movement of a module is then actuated by the controller to execute a programmed tilt and spin motion associated with the station in synchronization with other programmed operations to be performed at the station.

20 Claims, 12 Drawing Sheets

SCREENING MACHINE SYSTEM

BACKGROUND OF THE INVENTION

1. Field of the Invention

This invention relates to method and apparatus for the manufacture of glass panel screens for monitors and television picture tubes, and more particularly to a glass panel screen machine that permits a plurality of adjustments to be efficiently made to the machinery for coating the glass panels of television monitors and the like.

2. Description of the Prior Art

The screen of a cathode ray tube for television monitors is coated with a plurality of colored dots or pixels. These dots glow under the impact of high-speed electrons. Conventionally the pixels are red, green, and blue on a black background.

A process for applying the colored pixels to the glass screen of a cathode-ray tube is disclosed in U.S. Pat. No. 3,319,759 and involves a sequence of steps performed at a number of stations arranged in a circuit. An individual glass panel or screen is automatically advanced from station to station where individual operations are performed in applying colored pixels to the screen in a preselected fashion. With this device each screen is supported by a workholder mounted on a cart which moves along a conveyor from station to station. The relative position of a screen at each station is controlled by motors for effecting rotational and tilting motion of the workholder. The movement of the screens from work station to work station is controlled by a drive system that includes a driving motor and a driving clutch element engageable with a driven clutch element. Separate drive systems generate rotational and tilting movement of the workholders at the stations.

U.S. Pat. No. 3,832,211 also discloses a process for the manufacture of cathode ray tube front panels in which a plurality of work stations are equally spaced around the perimeter of a conveyor. A processing operation occurs at each work station. Workpiece holders on the conveyor carry a picture tube panel from one work station to another in a step-by-step fashion. Each panel is supported with the front side up so that its phosphor coated surface is directed downwardly toward washing devices, lacquer application devices and the like. At each work station the rotational speed of a panel is selected based on the processing operation to be performed. The speed selection is accomplished by activation of selected speed control switches that move with the conveyor into contact with cams positioned at each station. By varying the position of the cams at the work stations, one or more switches are activated to cause the motor to run at a predetermined speed.

U.S. Pat. No. 3,364,054 discloses in a process for making phosphor screens for cathrode ray tubes a method for salvaging an excess of phosphor slurry applied to a faceplate panel. During the various operations the faceplate panel is supported by a carrier movable along fixed rails. A drive system generates rotation of the panel at preselected rates and angles of rotation at each work station depending on the operation to be performed.

A number of other approaches have been taken to select and control the angular positions for rotation and speed of rotation of glass panels in screening operations. Specific examples are disclosed in U.S. Pat. Nos. 2,770,557; 2,769,733; and 3,376,153. While it is known to apply a plurality of phosphor layers on a glass panel for a cathrode ray tube to form a triad arrangement of colored dots. The known apparatus utilizes a plurality of work stations arranged in a circular conveyor path. The rotational speeds and angles of tilt of the panels at each station must be individually controlled. The present arrangements do not facilitate adjustments to be made in panel tilt angles or rotational speeds without shutting down the process for considerable periods of time, thus delaying production.

Therefore there is need for a screen machine system that permits rapid and efficient adjustments to be made in the various operations that are performed on the screen at the individual stations and in the movement of the screen from station to station.

SUMMARY OF THE INVENTION

In accordance with the present invention there is provided apparatus for handling a glass panel in a process for manufacturing a cathode ray tube that includes a circular track with a plurality of stations positioned in spaced relation around the circular track. Selected operations are sequentially performed on a glass panel at each station in the process of fabricating a cathode ray tube. Conveyor means supported by the circular track sequentially advances the glass panel from station to station. A module is fixedly mounted on the conveyor means oppositely of each station to position a plurality of the modules in spaced relation one from another on the conveyor means around the track. Drive means connected to the conveyor means advances and stops the conveyor means to move the modules in timed relation step-by-step from one of the stations to the next adjacent one of the stations. Holding means engage and disengage the glass panel on the module. Tilt and spin drive means connected to the holding means move the holding means to position the glass panel at a preselected angle and rotate the glass panel at a preselected speed and interval of time at the station. Sensing means positioned on the module detect the presence of the glass panel on the holding means to initiate actuation of the tilt and spin drive means for selective angular positioning of the glass panel for rotation at a preselected speed and time interval.

Further in accordance with the present invention there is provided apparatus for controlling the movement of a glass panel at a station in a machine for manufacturing a cathode ray tube that includes a frame positioned adjacent the station. A module is mounted on the frame oppositely of the station. A holder has a surface for receiving and supporting the glass panel. Drive means connects the holder to the module to position the holder at a preselected angle on the module and rotate the holder at a preselected speed for a preselected interval of time. Engaging means secures the glass panel on the holder for movement of the glass panel to a preselected angular position on the module for rotation of the glass panel at a preselected speed and interval of time. A sensor is positioned on the holder and connected to the engaging means. The sensor is responsive to the presence of the glass panel in position on the holder to actuate the engaging means to secure the glass panel on the holder. A controller is mounted on the module for initiating operation of the drive means for preselected angular movement and rate of rotation of the glass panel plate. The controller is connected to the sensor and is actuated upon detection of the glass panel on the holder by the sensor to initiate operation of the drive means.

An additional feature of the present invention is a method for advancing a glass panel from station to station around a circular track in a process for making the glass panel of cathode ray tubes that includes the steps of positioning a glass panel for rotational and angular movement on a module. The module is advanced in time relationship from station to station around a circular track for processing the glass panel at each of a plurality of stations. The presence of a module is detected at each station. A decoded signal is transmitted to a controller in response to the presence of the module at each station. The station corresponding to the decoded signal for performing a preselected operation on the glass panel is identified at the controller. A return signal is transmitted to the module corresponding to the preselected operation to be performed on the glass panel at the station. Thereafter, the glass panel is tilted on the module to a preselected angle and rotated at a preselected speed for a desired time interval corresponding to the selected operations performed on the glass panel at the station.

Accordingly, the principal object of the present invention is to provide method and apparatus for processing a glass panel of a cathode ray tube by sequentially advancing the glass panel from station to station in a continuous circular conveyor path and performing at each station selected processes.

Another object of the present invention is to provide method and apparatus for holding a glass panel in a module for advancement from station to station in a screening machine and automatically controlling at each station the operations performed on the glass panel.

An additional object of the present invention is to provide in a glass panel screening machine apparatus for holding a glass panel on a module where detection of the glass panel on the module initiates selected operations to be performed on the glass panel in the screening process.

These and other objects of the present invention will be more completely disclosed and described in the following specification, the accompanying drawings, and the appended claims.

DESCRIPTION OF THE PREFERRED EMBODIMENT

Figure 1:
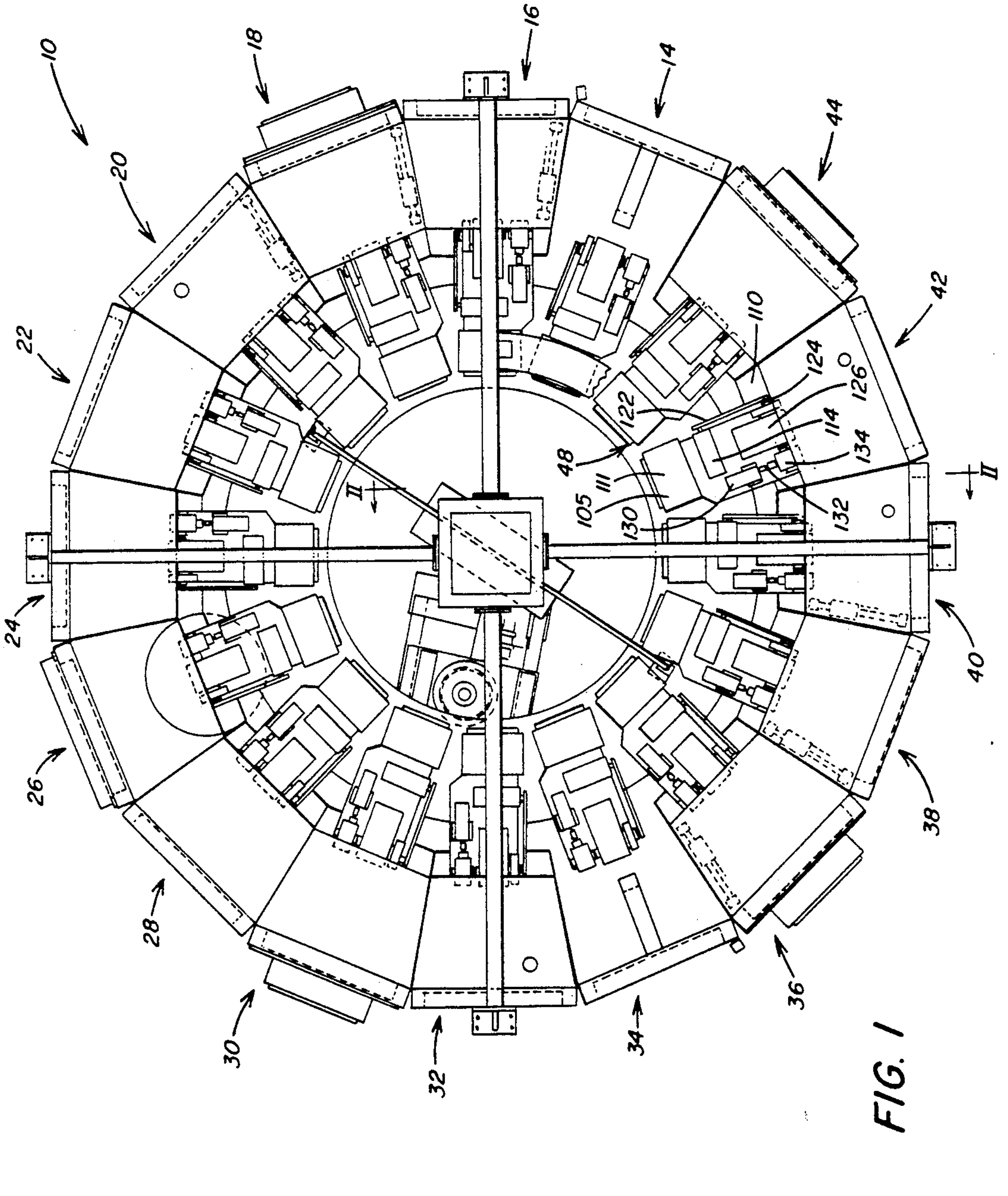
FIG. 1 is a top plan view of a glass panel screening machine, illustrating the arrangement of individual stations for performing the screening operations.

Referring to the drawings and particularly to FIG. 1 there is illustrated a glass panel screening machine generally designated by the numeral 10 for accepting a conventional 19 inch rectangular color TV glass panel, as known in the art, in a process for producing on the glass panel red, green, and blue phosphor pixels and a black matrix background. The screening machine includes a plurality of stations positioned around a circular track. The glass panels are advanced from station to station in timed relation for the performance of individual screening operations at each station. Each station is associated with a two axis programmable arm module that includes its own motors, programs, mechanics and controls for transporting a glass panel along the circular track to each station, as will be explained later in greater detail. With the embodiment of the screen machine shown in FIG. 1, sixteen stations are utilized; however, the present invention is not limited to these specific functions or number of stations. A greater number of stations, for example twenty stations, can be utilized in a circular array.

Figure 2:
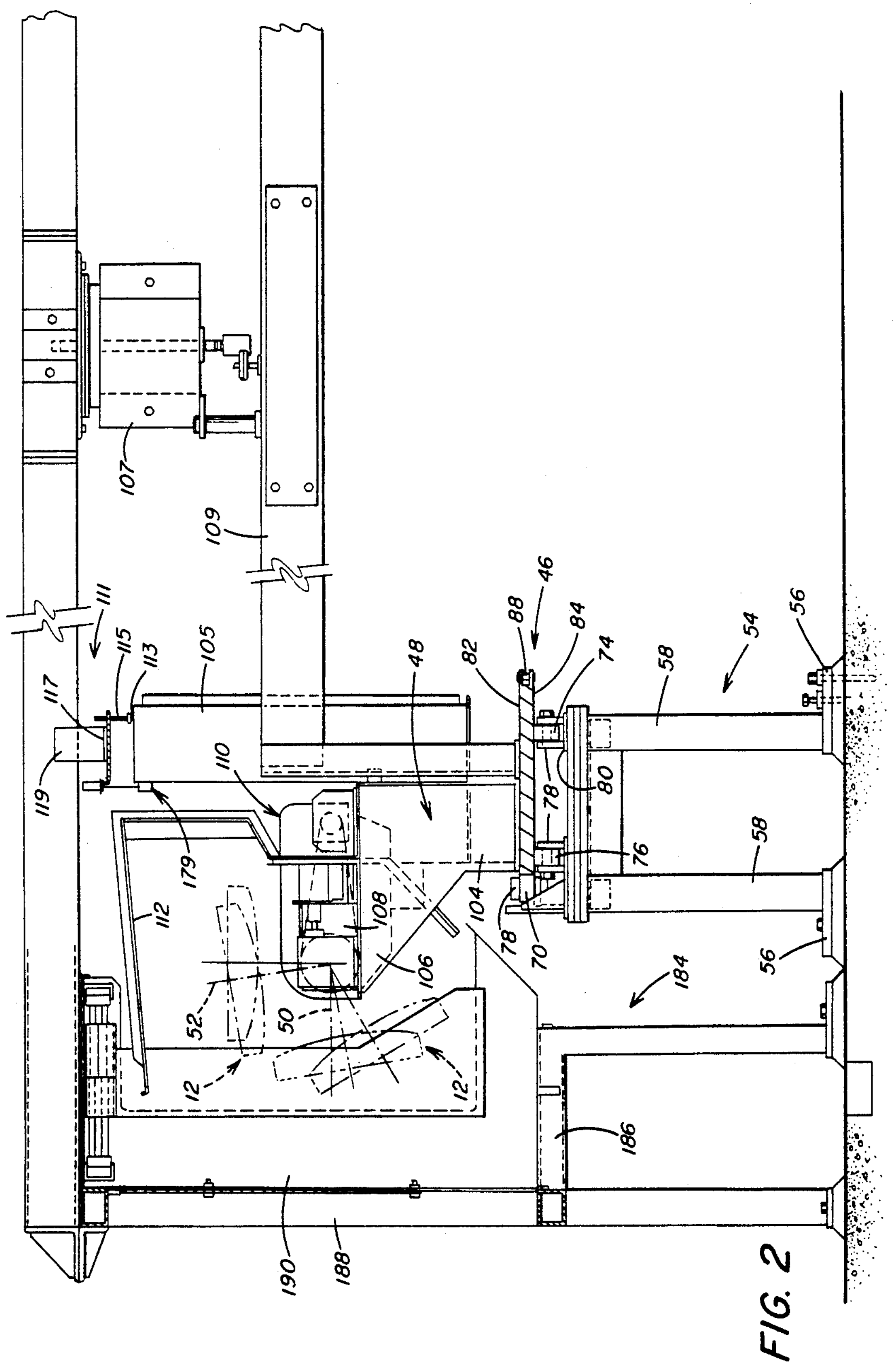
FIG. 2 is a partial sectional, elevational view taken along line II—II of FIG. 1 of one of the stations of the glass panel screening machine, illustrating in phantom, adjustments in the relative positions of the screen at the station.

In normal operation the glass panels generally designated by the numeral 12 in FIG. 2 are manually loaded and unloaded into the machine 10 at one of two designated stations, known as the load/unload stations. The remaining stations are operated automatically to receive the glass panel from a prior station. In a typical operation the time for transferring a glass panel 12 from station to station is variable but preferably in the range between about 1.5 to 3.0 seconds. The process time required at each individual station is about 40.0 seconds. Also in accordance with the present invention the screening machine 10 may be operated in the jog mode for manual control during set-up, testing, and maintenance.

Sixteen stations are positioned in a circular pattern for the embodiment of the screening machine 10 shown in FIG. 1. Station 14 is the first station where loading and unloading of the glass panels into the machine 10 is performed. From station 14 a glass panel is transferred to a second station 16 where the operations of a DI water rinse and a spin are performed. The operation at this station is idle for the red and blue pixel machines. At station 16 a jet spray of DI water is performed at a preselected temperature, preferably 43° C. and a pressure of approximately 0.7 Kg/cm sq.

From station 16 the glass panel is transferred to a third station, station 18, where polyvinyl alcohol (PVA) is dispensed onto the glass panel at a pressure adjusted for the volume dispensed. An example volume is 60 ml. of PVA. At station 18, following the dispensing of the PVA, the glass panel 12 is spun for a preselected time interval to universally distribute the PVA over the surface. For the blue and red pixel machines this station is also idle.

From the third station 18 the glass panel is transferred to a fourth station, station 20, where the operations of spinning and heat drying occur. Heating is accomplished by translucent quartz heaters or cal rods. The PVA coated glass panel is heated to a temperature of approximately 40°-43° C. for 40 seconds at station 20. Again for the red and blue pixel machines this station is idle.

After the spin and heat dry operations are performed at station 20 the glass panel 12 is advanced automatically to a fifth station, station 22. At station 22 a slurry is dispensed corresponding to the desired color, for example green, in an amount of preferably about 70 ml., from an arm which swings into and out of position above the glass panels. The timing for the slurry dispensing is adjusted for the slurry volume. Also, as will be explained later in greater detail, the time the glass panel is retained at each station is automatically adjustable, as well as the other parameters of angular position of the glass panel at the station and, in the case of the spinning operation, the rpm of the glass panel.

In one example of the present invention, at the first station 14 the glass panel is retained for a period of 40 seconds at a tilt angle of 100°. No rotation takes place at the first station. At station 16 the operations of rinse and spin take place. For example, during the rinse cyle DI water is sprayed for a period of 10 seconds with the glass panel at a 120° angle and rotated at 9 rpm. Thereafter a first spin cycle takes place for a period of 15 seconds at a tilt angle of 120° at 60 rpm thereby followed by a second spin cycle that takes place for 15 seconds at a tilt angle of 120° at 100 rpm. Accordingly, with the present invention the parameters of retention time, angle of tilt, and rpm are automatically adjustable without having to make manual adjustments that take the screening machine 10 out of operation.

The dispensing of the colored phosphor slurry takes place at the fifth station, station 22. The glass panel 12 is spun at, for example, 8 rpm at an angle of 20° for 8 seconds while dispensing about 70 ml. of phosphor slurry over the surface of the glass panel. Thereafter the glass panel 12 is advanced to a sixth station, station 24 where the glass panel is retained for a period of 40 seconds at a tilt angle of 20° and is rotated 8 rpm in order to uniformly spread the slurry on the surface of the glass panel 12. From station 24 the glass panel 12 is advanced to a seventh station, station 26, where the glass panel goes through a sequence of tilting movements simultaneously with spinning the glass panel so that excess slurry on the surface of the glass panel is removed and reclaimed into a slurry collector that surrounds the glass panel. During this operation the glass panel is rotated at a speed varying from 25 to 250 rpm. The spin rpm is adjusted to obtain a specified coating weight.

After the tilt and spin operation performed at station 26, the glass panel is advanced to an eighth station, station 28 where spin drying is performed. At station 28 quartz heaters are utilized to obtain the desired drying temperature. Following the spin-dry operation the glass panel 12 is transferred to a ninth station, station 30. At station 30 the glass panel rim is DI water washed, followed by a vacuum operation, which in turn is followed by a tilt and spin cycle. For example, the glass panel is spun for a period of 3 seconds at a tilt angle of 100° and at a rotational speed of 15 rpm.

At the tenth station, station 32, further spinning at a selected angle and drying for a selected time interval of the glass panel is accomplished with quartz heaters. At an eleventh station, station 34, the processed glass panel and associated mask is unloaded for selected exposure in a conventional light house. At the light house a high intensity light is focused through a lens onto the glass panel to fix the phosphor onto the surface of the glass panel. Thereafter the exposed glass panel and matching mask is loaded on the module for advancement to the twelfth station. At the twelfth station, station 36, an oscillating DI water spray is applied to the glass panel to remove any undeveloped phosphor screen material. Thereafter the glass panel 12 is rinsed and spun at a thirteenth station, station 38.

After the rinse operation at station 38 the glass panel is automatically transferred to a fourteenth station, station 40, where the glass panel is spun and heat dried. A subsequent spin/heat dry operation is also performed at the fifteenth station, station 42. Finally with the embodiment shown in FIG. 1 a final spin/dry cycle is performed at the sixteenth station, station 44. At station 44, for example, a spin/dry operation is performed for a period of 35 seconds with the glass panel positioned at a tilt angle of 100° and spun at a speed of 100 rpm. A slow spin at 9 rpm then takes place for a period of 5 seconds at the same tilt angle.

The above described operations performed at the sixteen stations are repeated for each application of the red, green and blue pixels on the glass panels. Separate screening machines 10 are set up for the application of each pixel color applied to the glass panels. Following the application of the colored pixels the untreated background of the glass panel is applied with a black matrix coating at a separate machine 10. Therefore, it is preferred that in a complete operation four sets of screening machines 10 are utilized.

The structure of each screening machine 10 irrespective of the color coating is the same. In accordance with the present invention versatility is accomplished by the provision for making adjustments for the type of operation performed at each station, retaining the glass panel at a particular tilt angle, and moving the glass panel at a preselected rpm or retaining the glass panel stationary.

In a twenty station machine, not shown, the structure of each station is identical to that for the sixteen station machine described above but includes the operation of dispensing a "dag" slurry instead of colored phosphorus. Since the chemical composition of this mixture is different, additional stations are utilized such as the "dag" dispensing station, a hydrogen peroxide dispensing station and an acid edge cleaning station.

The construction of the glass panel screen machine 10 is identical for both a sixteen and a twenty station machine. FIG. 1 illustrates the arrangement of sixteen stations in a circular track as described above. The stations are arranged in a circular pattern around a turntable generally designated by the numeral 46, shown in detail in FIGS. 2, 7, and 8. Mounted for movement on the turntable 46 and associated with each station is a two axis (spin and tilt) programmable arm module generally designated by the numeral 48, as shown in FIG. 2. Each arm module 48 is equipped with its own motor, programs, mechanics and onboard control for rotary and tilt drive. Power is supplied to each arm module 48 through a 200 amp slip ring, numeral 107, and air is supplied through a rotary swivel air joint.

Figure 6:
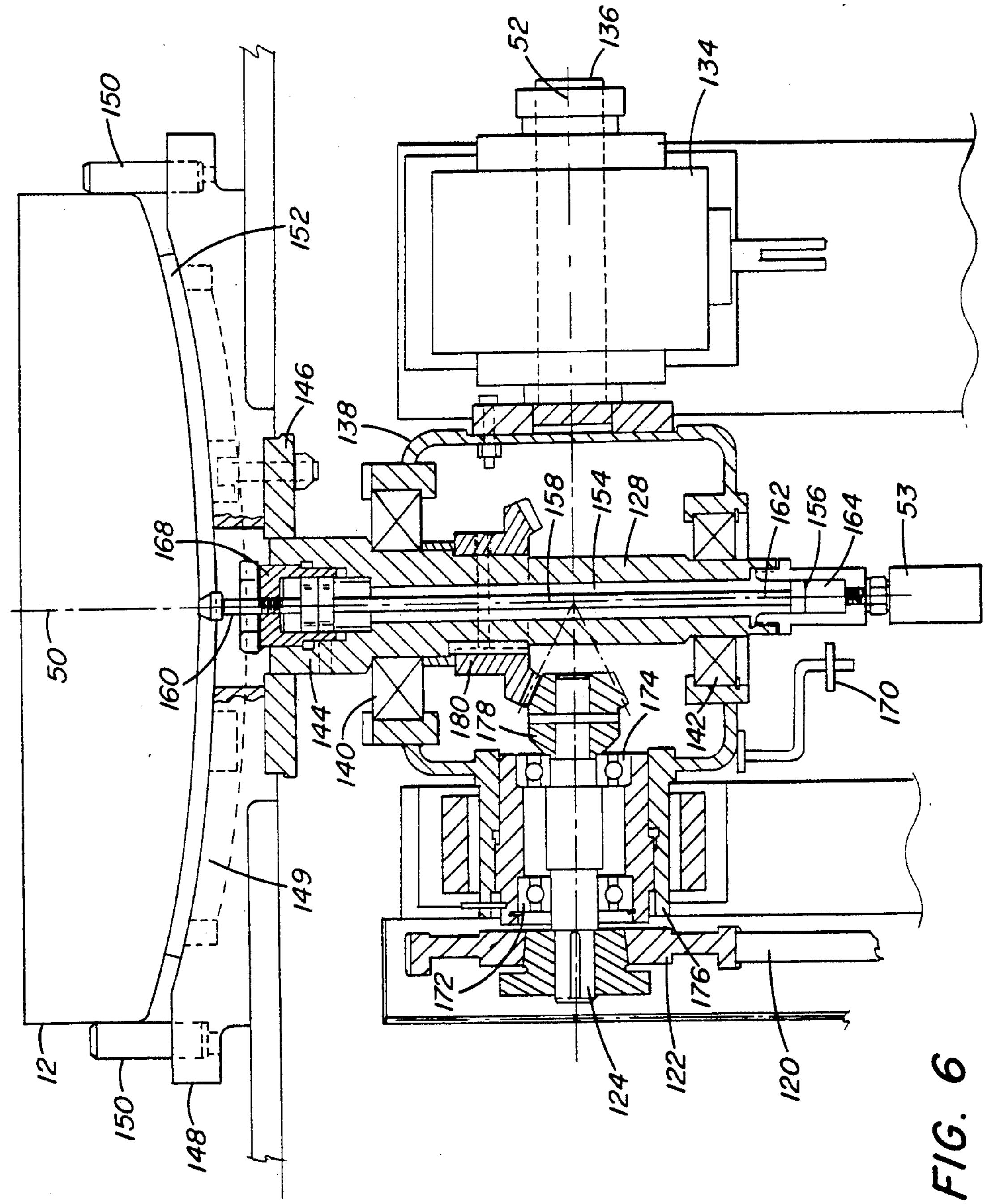
FIG. 6 is a sectional view of the spin and tilt drive module taken along line VI—VI of FIG. 5.

As shown in FIG. 2 each arm module 48 contains a spin axis 50 and a tilt axis 52. The spin/tilt arrangement is illustrated in detail in FIG. 6. The spin drive includes a servomotor with controller, belts, pulleys, gears and drive shaft, as will be explained later in greater detail. Also associated with the spin drive shown in FIG. 6 is the rotary union 53 for actuation of a vacuum system, a tooling plate 148, which holds the glass panel, a panel actuator, and a proximity switch 170. Similarly, the tilt drive shown in FIG. 6 includes a servomotor with controller and gear reducer.

Control station switches are associated with each rotary drive of an arm module 48. The switches include one panel present switch which is activated when a glass panel is loaded onto the tooling plate, and a plurality of magnetic proximity switches. The proximity switches are activated by individual magnets, located at each station, to communicate to the control cabinet the applicable subroutines to run.

Each arm module 48 associated with the sixteen stations includes two servo/drives, one for tilt and one for spin. During the start up routine an arm module 48 executes a "home" routine which tips the arm a few degrees forward and then returns the arm to the home limit switch position. At the load and unload station, for example station 14, the arm module 48 is operable to tilt 100° to receive or remove a glass panel 12.

When the glass panel 12 is positioned on the arm module 48, a proximity switch (shown in FIG. 6) indicates its presence. This indication is received by a servo drive which is electrically connected to a combination phototransmitter and receiver located on the station control cabinet of the arm module. A signal from the proximity switch actuates the controller in the station control box to initiate operation of the phototransmitter to transmit a signal to a programmable logic controller located at the main control console. The programmable logic controller, in turn, transmits a return signal through the phototransmitter on the arm module 48 to the controller in the cabinet associated with each arm module 48. Upon receipt of the return signal on the arm module 48 the station control switch is actuated to determine at which station the arm module 48 is positioned for actuation of the tilt and spin drive console for performing the required operations at the respective stations. This operation will be explained later in greater detail.

Figure 2A:
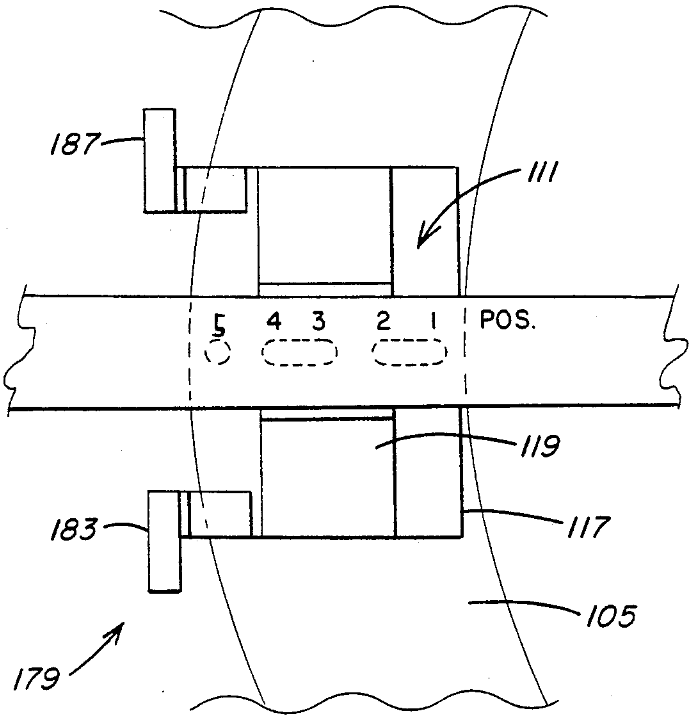
FIG. 2A is a top plan view of a station control switch, schematically illustrating electrical switches on an arm module and accompanying magnets at the station.
Figure 2B:
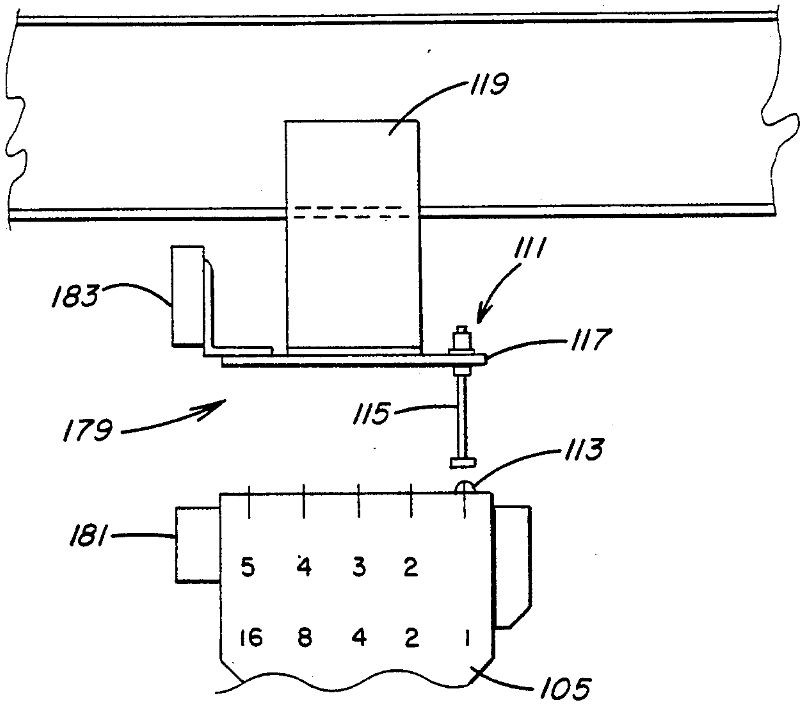
FIG. 2B is a view in side elevation of the station control switch shown in FIG. 2A.

Proximity or position switches, such as magnetic reed switches, are carried by each arm 48 as shown in FIGS. 2, 2A, and 2B. Selected switches on each arm module 48 are closed by magnets at each process station to generate a signal representing a binary number which corresponds to that station. The programs for the tilt and spin drives are subsequently executed to actuate the motors on the arm module 48 to perform the the desired tilt and spin maneuvers associated with the particular station. At the required time, the programmable logic controller initiates the peripheral equipment for processing the glass panel at the respective station. The tilt and spin functions performed by the motors on the module 48 are synchronized with the other operations such as spraying, heat generation and others which are controlled by the programmable logic controller at the main control console for the machine 10. If a glass panel is not present at a station, then no processing equipment is energized, however, advancement of the module 48 from station to station continues at timed intervals.

Figure 7:
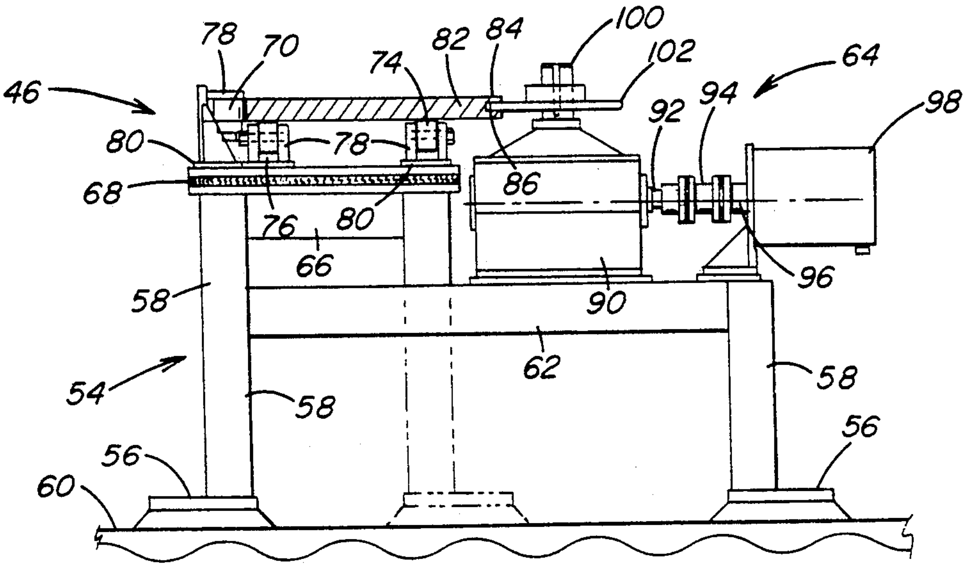
FIG. 7 is an enlarged fragmentary view in side elevation of the turntable for advancing arm modules from station to station.
Figure 8:
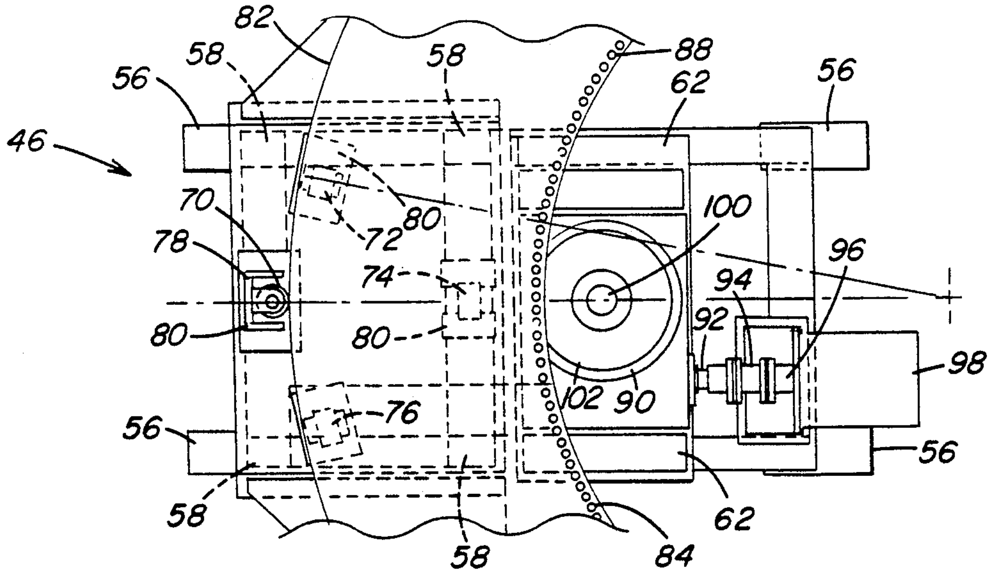
FIG. 8 is a fragmentary top plan view of the turntable shown in FIG. 7.

Now referring to FIGS. 2, 7, and 8, there is illustrated the turntable 46 which controls movement of the plurality of arm modules 48 from station to station in the circular path of the screening machine 10. As seen in FIGS. 7 and 8, the turntable 46 includes a transfer base 54 having pads 56 and upright members 58. The pads 56 are suitably supported by pedestals at an elevation above the floor level 60. The pads 56 are connected by bolts to the pedestals on the floor. A first horizontal member 62 connected to the upright members 58 supports a drive mechanism generally designated by the numeral 64. A second horizontal member 66 above the horizontal member 62 supports a vibration pad 68.

Rotatably supported on the vibration pad 68 are a plurality of rollers 70, 72, 74, and 76. Each roller, as shown in FIGS. 7 and 8, is rotatably mounted by spaced apart roller brackets 78 mounted on roller support plates 80 which are secured to the vibration pad 68. With this arrangement the rollers 70, 72, 74 and 76 are mounted on the vibration pad 68 supported by transfer base 54 in the closed loop of the screening machine 10. Extending around the closed loop and rotatably supported by the rollers 70, 72, 74 and 76 is a turntable track 82. Track 82 has an outer peripheral edge that contacts the roller 70, and the rollers 72, 74, and 76 engages the lower surface of the track 82.

An inner peripheral edge 84 of the track 82 includes a circumferential groove 86, through which extend in parallel spaced relation, vertically positioned pins 88. As shown in FIGS. 7 and 8, positioned adjacent the track inner peripheral edge 84 on the transfer base horizontal member 62 is a gear reducer 90 having an input shaft 92 connected by a coupling 94 to an output shaft 96 of motor 98 also mounted on the horizontal member 62. Rotation of the motor output shaft 96 is transmitted to the gear reducer input shaft 92 and therefrom through the gear reducer 90 to an output shaft 100 for rotation of a drive gear 102. Drive gear 102 meshes with the spaced apart pins 88 on the inner peripheral edge 84 of the turntable track 82. In this manner the track 82 is rotated to carry the arm modules 48 in an indexed fashion from station to station as shown in FIG. 1. For example, the arm modules 48 are controlled to advance from one station to the next every 40 seconds.

An arm module 48 for supporting a glass panel 12 is associated with each station; therefore, for a sixteen station screening machine, sixteen arm modules 48 are supported by the turntable 46. A representative mounting of an arm module 48 on the turntable 46 is shown in FIG. 2. Each arm module 48 includes a horizontal frame 104 bolted to the upper surface of the turntable track 82. The frame 104 includes an arm 106 that projects outwardly toward the associated station and includes a horizontal surface 108 for supporting a tilt and spin drive mechanism generally designated by the numeral 110, as shown in detail in FIGS. 3-5.

Figure 3:
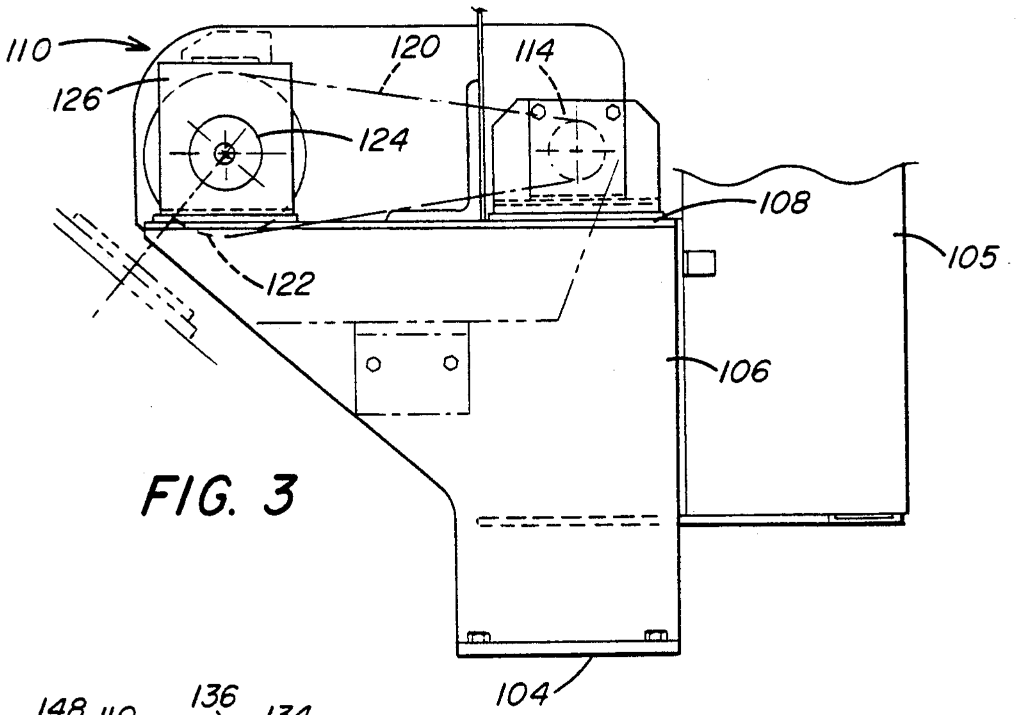
FIG. 3 is an enlarged fragmentary view in side elevation of a tilt and spin drive module for control of positioning of the glass panel at the station shown in FIG. 2.

As shown in FIG. 3 the frame 104 supports a station control cabinet 105 associated with each arm module 48. The cabinet 105 houses the electronics for connecting and controlling the supply of power to each module 48 through a slip ring-type power connection 107 shown in FIG. 2. Electrical circuitry extends from cabinet 105 along support arm 109 to the connection 107. Connection 107 is supplied with electrical power from a main console, programmable controller. Thus, each arm module 48 is connected in this manner to the main console.

The spin and tilt drive mechanism 110 effects tilting of the glass panel 12 about the tilt axis 52 and rotation about the rotary axis 50. Separate motors and controls are provided for generating the tilt and spin maneuvers. An example of the relative tilt of the glass panel 12 is shown in FIG. 2 where the plate is tilted to an initial position of 0° and thereafter is tilted to a position of 100° for spraying. Extending upwardly from the arm 106 above the tilt and spin drive mechanism 110 is a hood construction 112 that overlies the area in which the glass panel is positioned on the respective arm module 48. The hood construction 112 also supports the mask during processing.

Figure 4:
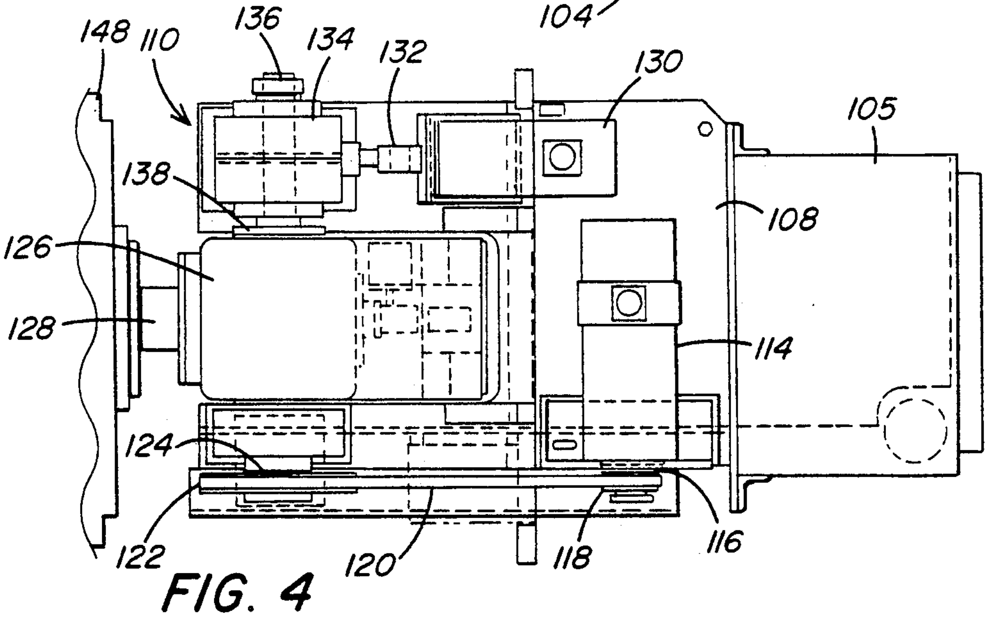
FIG. 4 is a top plan view of the tilt and spin drive module shown in FIG. 3.

As illustrated in detail in FIGS. 3 and 4, the tilt and spin drive mechanism 110 is mounted on each arm module 48, the controls therefore are housed within the station control cabinet 105. The mechanism 110 is actuated at each station by a station control switch generally depicted by the numeral 111 in FIG. 2 and shown in detail in FIGS. 2A and 2B. Each station is provided with a station control switch 111 which includes a plurality of magnetic reed switches 113 carried atop control cabinet 105. As will be explained later in greater detail, each switch 113 positioned on an arm module 48 corresponds to a binary number which represents a function to be performed at a station, for example, tilt angle and spin speed.

The magnetic reed switches 113 are activated (closed) by magnets 115 suspended by a bracket 117 in overlying relationship with the switches 113. The bracket 117 is securely connected by a mounting plate 119 to the support structure of the station frame as shown in FIG. 2. The selection of location and number of magnets 115 at each process station is determined by the process operation to be performed at the station. The presence of magnets 115 opposite switches 113 generates a binary number and a corresponding signal which is transmitted to tilt and spin servo, programmable controllers connected to the drive mechanism 110. A controller is located in the station control cabinet 105 of each arm module 48, as illustrated in FIG. 2. Each controller deciphers the binary number and activates individual motion programs for operating mechanism 110 at the selected angle of tilt and rate and interval of rotation at the station. A suitable controller for use in the present invention is sold by Tyreso, Inc. of Wexford, PA, under part no. 66K0188.

The tilt and spin drive mechanism 110 is supported by the arm 106 and includes a spin drive motor 114 rigidly mounted on the horizontal surface 108 of the arm. The motor 114, as shown in detail in FIGS. 3 and 4, includes an output shaft 116 with a pulley 118 nonrotatably mounted thereon. The spin drive motor 114 is electrically connected to the programmable controller which is housed within the control enclosure 105 secured to the arm 106 of each module 48. The programmable controller is, in turn, electrically connected to the station control switch 111 shown in FIGS. 2, 2A and 2B. The control switch 111 activates the controller which in turn initiates the tilt and spin operations as desired, at each station.

A drive belt 120 extends around the pulley 118 to the opposite end around a pulley 122 nonrotatably connected to a driven shaft 124 of a spin and tilt drive 126 which is also mounted on the arm horizontal surface 108. The driven shaft 124 is drivingly connected to a spiral bevel gear set 178, 180 within the spin and tilt drive 126. The spiral bevel gear set 178, 180 is connected to a driven shaft 128, as shown in FIG. 6.

Figure 5:
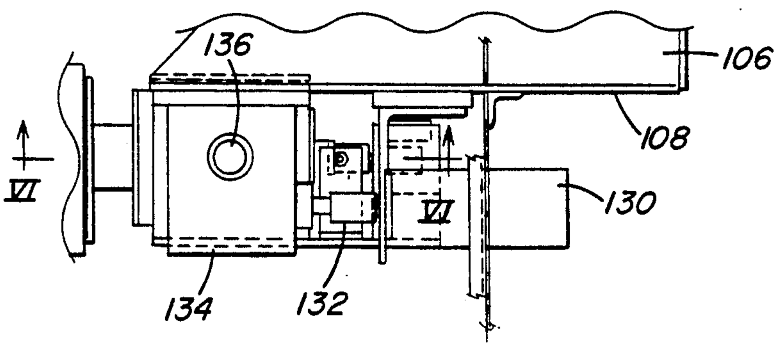
FIG. 5 is an enlarged fragmentary right side view of the tilt and spin drive module shown in FIG. 4.

The tilt and spin drive mechanism 110 also includes on the arm 106 a tilt drive motor 130, as shown in FIGS. 4 and 5. The tilt drive motor 130 is connected by an output shaft 132 to a gear reducer 134. The tilt drive motor 130 is also electrically connected to the programmable controller housed within enclosure 105 and connected to the station control switch 111. The gear reducer 134 includes a through shaft 136 which is nonrotatably connected at the opposite end to drive housing 138 of the spin and tilt drive 126.

Now referring to FIG. 6, there is illustrated in greater detail the drive mechanism connecting the spin drive motor 114 and the tilt drive motor 130 to the spin and tilt drive 126. The driven shaft 128 of the spin and tilt drive 126 is rotatably supported within drive housing 138 by bearings 140 and 142. The shaft 128 includes an enlarged end portion 144 that extends from the bearing 140. The end portion 144 is received within and connected to a plate 146 that supports a concave-shaped holder 148 for the glass panel 12. Stops 150 protrude from the outer edges of the holder 148 to retain the glass panel 12 at the desired position relative to the holder 148.

Positioned between the exterior surface of the glass panel 12 and the holder 148 is a seal 152 for vacuum sealing the glass panel on the holder 148. The holder 148 includes a cavity 149 from which air is extracted by a vacuum pump system shown in FIG. 6A from beneath glass panel 12 creating a vacuum to hold the glass panel 12 on the holder 148. With this arrangement the glass panel 12 is movable into and out of position on the holder 148.

The shaft 128 includes a through bore 154, and a panel present tripper 156 is positioned in the through bore 154. The tripper 156 includes an elongated, vertically movable spring biased rod 158 having an upper end portion 160 adapted to engage the glass panel when positioned in the holder 148 and a lower end portion 162 received for vertical movement within a socket 164 which supports rotary connector 53. Mounted on the drive housing 138 is a proximity switch 170. The switch 170 is tripped when the rod upper end portion 160 is contacted by a glass panel in holder 148 when the rod 158 is downwardly displaced.

The proximity switch 170 is electrically connected in a conventional manner to the tilt and spin drive 110. Closing switch 170 permits the mechanism 110 to initiate the operation of the station control switch 111 at that particular station. Operation of switch 111 permits execution of the program for tilt and spin associated with the station and operation of the equipment for processing the glass panel at that station.

Figure 6A:
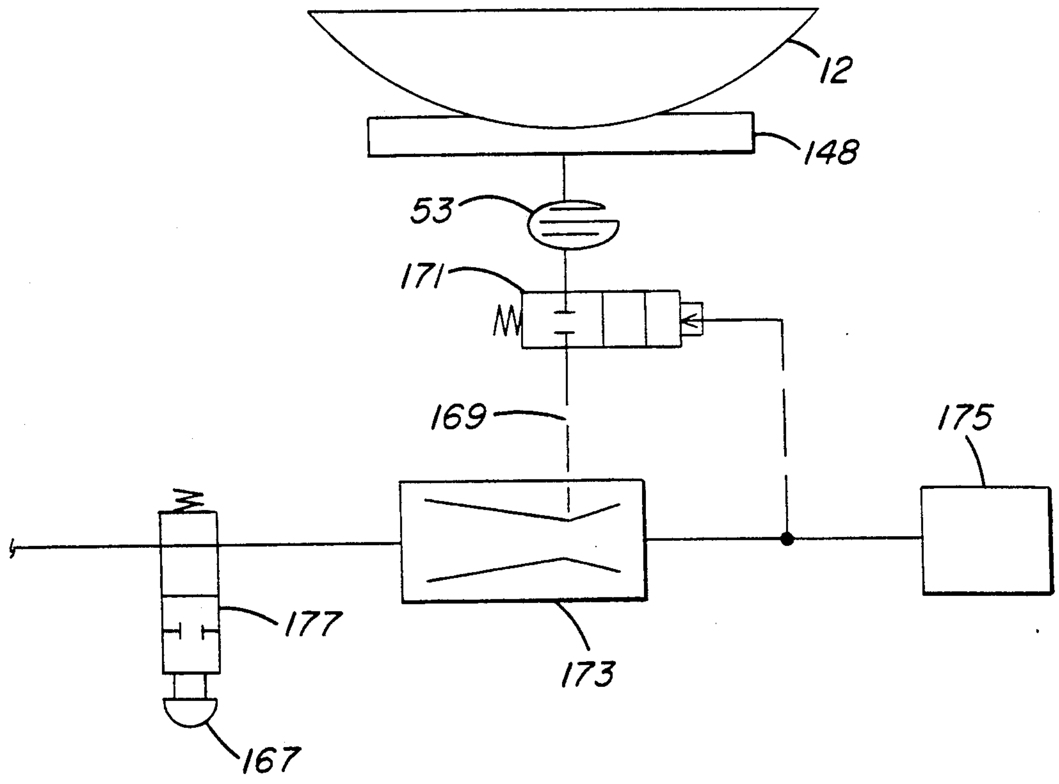
FIG. 6A is a schematic illustration of the vacuum pump system for engaging and releasing the glass panel with respect to a panel holder at each station.

Depression of rod 158 also initiates the vacuum system schematically illustrated in FIG. 6A. A vacuum pump 173 is positioned in fluid communication with a compressed air source 175 and roller actuated two-way valve 177. A spring biased spool valve 171 is normally maintained in an open position and is connected to the air source 175 as shown in FIG. 6A. When a valve controlling the supply of air from source 175 is opened, air flows to valve 171 and through pump 173. Air to valve 171 overcomes the spring pressure to shift valve 171 to an open position. Pump 173 includes a venturi section in fluid communication with the compressed air source 175 and two-way valve 177 and through conduit 169 with holder 148. When valve 177 is in the open position as shown in FIG. 6A compressed air is directed through conduits from source 175 through the venturi section of pump 173 and valve 177. Flow of air through the venturi section creates a vacuum in conduit 169. This vacuum force is applied to the glass panel 12 to securely hold the glass panel 12 in the holder 148.

In the event of a loss of power, air pressure from the source 175 is lost, and the spring pressure on valve 171 acts to close valve 171 and lock the vacuum in the conduit 169 between valve 171 and holder 148. With the vacuum to holder 148 being maintained, the glass panel 12 will not drop or dislodge from its position on holder 148. Intentionally the glass panel 12 is released from the holder 148 by pressing on a foot pedal 167 of valve 177 to stop the air flow through valve 177. Air pressure then builds in the conduit to valve 177 and pump 173 to, in turn, pressurize conduit 169 through valve 171 to the holder 148. When the pressure behind the glass panel 12 on holder 148 builds to a selected magnitude the panel 12 is ejected from the holder 148.

Referring to FIG. 6, to generate rotation of the glass panel 12 once the glass panel 12 is vacuum engaged on holder 148, the spin drive motor 114, discussed above, is actuated by its controller to generate, by rotation of belt 120 and pulley 122, rotation of driven shaft 124. The driven shaft 124 is rotatably supported by bearings 172 and 174 within a housing 176 which is connected to drive housing 138 of the spin and tilt drive 126.

The driven shaft 124 transmits rotation from the pulley 122 to a bevel gear 178 which is keyed to driven shaft 124. Gear 178 meshes with bevel gear 180 keyed to shaft 128. Thus rotation of shaft 124 is transmitted to shaft 128 which, in turn, rotates the holder 148 supporting the glass panel 12 at a preselected rpm.

Tilting of the holder 148 and, accordingly, of the glass panel 12 is accomplished by actuation of the tilt drive motor 130 shown in FIGS. 4 and 5. The output shaft 132 of the motor 130 is coupled to shaft 136 of a gear reducer 134. Shaft 136 is connected to drive housing 138 as shown in FIG. 6. Upon rotation of the shaft 132, the shaft 136 is rotated to transmit tilting motion to the drive housing 138 that supports the shaft 128 connected to the holder 148. When the drive housing 138 rotates, gear 180 turns about gear 178 to tilt the holder 148 and glass panel 12.

Figure 2C:
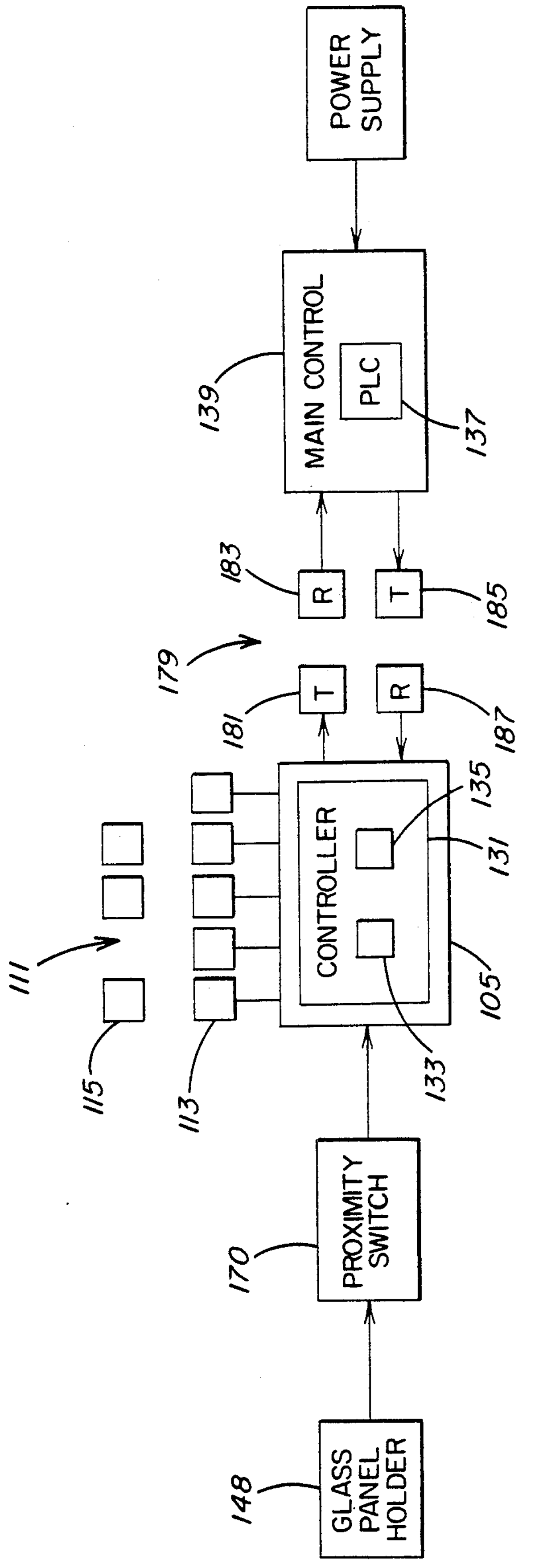
FIG. 2C is a diagrammatic illustration of the apparatus for controlling the operations to be performed at the screening machine stations.

Referring to FIG. 2C there is diagrammatically illustrated a controller 131 which is positioned within each cabinet 105 and includes one control component 133 for the tilt drive motor 130 and a second control component 135 for the spin drive motor 114. In operation, the tilt drive motor 130 is operated by its respective control component 133 in rsponse to actuation of the station control switch 111 to effect a programmed angle of tilt of the glass panel for a preselected operation to be performed at a specific one of the stations. For example, at the load and unload stations of the screening machine 10, the control component 133 is programmed to actuate the motor 130 to tilt holder 148 to an angle of 100° from the initial position as shown in FIG. 2 to receive or remove the glass panels. Thus, the control component 133 is programmed to actuate the tilt drive motor at each station in response to actuation of control switch 111 when the arm module 48 is moved to a respective station. The programmed subroutine is initiated when a glass panel 12 is placed in position on the holder 148, and the proximity switch 170 is actuated to generate a signal to a pulsed infrared permissive switch, to be described later in greater detail, on the station control cabinet 105 for communicating the location of the arm module 48 to the main console for eventual actuation of the control switch 111.

As above described, each station, for example stations 14–44, is equipped with magnets 115 for activating the reed switches 113 of the station control switch 111 on each arm module 48. A representative station control switch 111 is illustrated in FIGS. 2A and 2B. Each switch 113 functions as a proximity switch which when activated generates a binary number representing the presence of the glass panel 12 at a station where a selected tilt and spin operation has been programmed through the controller to be performed on the glass panel 12 at that station. The binary number generated by closing of the switches 113 by magnets 115 at each station actuates the respective control component 133 and 135 of controller 131 for controlled operation of the tilt drive motor 130 and the spin drive motor 114 to initiate the programmed subroutines for tilting the glass panel to a preselected angle and then spinning the glass panel at a preselected speed for a selected time interval.

In order to actuate the drive mechanism 110 through the station control switch 111, a glass panel must be inserted in the holder 148 on an arm module 48. Consequently, a signal is transmitted from proximity switch 170 on the arm module through a pulsed infrared permissive switch 179 to a programmable logic controller (PLC) 137 contained in a main console 139 adjacent the screening machine 10, diagrammatically illustrated in FIG. 2C. The controller 137 of the main console 139 includes a microprocessor having a plurality of modules programmed to actuate the desired operation to be performed at the individual stations. For example, modules are programmed to control the operations of slurry dispensing, vacuum cycles, PVA dispensing, heat cycles, rinsing, washing, D.I. water disposing and, develop spraying as well as initiate the program for the tilt and spin cycle associated with stations 14–44, discussed above.

The magnetic reed switches 113 on each arm module 48 are actuated by small magnets 115 located at each station 14–44, as schematically illustrated in FIGS. 2A and 2B. A representative switch 113 and magnet 115 is shown in FIG. 2B. The location and number of magnets 115 at each station corresponds to a predetermined binary number designated for that station. For example, the fifth station 22 shown in FIG. 1, would be identified by the binary number 10110 by actuation of the switches positioned oppositely of magnets located in position No. 1 and position Nos. 3 and 4 as shown in FIG. 2B.

As the arm modules 48 are advanced from station to station of the screening machine 10, the central controller 137 at the main console 139 must be signaled that a glass panel is in position on the arm module for processing by the equipment provided at the respective station.

This is accomplished by selectively locating on the enclosure of each arm module 48 a pulsed infrared permissive switch generally designated by the numeral 179 in FIGS. 2A, 2B and 2C that includes transmitter component 181 and a receiver component 183. The receiver component 183 is ground based and electrically connected to PLC 137. The PLC 137 also includes a transmitter component 185 and a receiver component 187 positioned on each arm module 48.

In operation proximity switch 170 actuates the controller 131 of tilt and spin drive mechanism 110 to transmit a signal to transmitter 181 of the infrared permissive switch 179. Transmitter 181 responsively emits a signal to receiver 183. Receipt of a signal by receiver 185 actuates the PLC 137 at the main console 139. The PLC 137 identifies the incoming signal with a respective station to initiate the process steps to take place at the station in association with the required tilt and spin maneuvers to take place at the station. The PLC 137 then actuates transmitter 185 to emit a signal to receiver 187 on the respective arm module 148. Upon receipt of the signal, receiver 187 activates one or more of the switches 113 to respond to the presence of a magnet 115 opposite a switch 113. The position of an activated switch 113 opposite a magnet 115 closes switch 113 and generates a binary number identifying the station and thus the tilt and spin maneuvers to be executed at the respective stations. The generated binary number actuates controls 133 and 135 of controller 131. The controls 133 and 135 are programmed to operate the tilt motor 130 and spin motor 114 as required at the respective station. At the same time the PLC 137 at the main console initiates the peripheral equipment for processing the glass panel at that station in synchronization with the tilt and spin maneuvers.

Within the station control cabinet 105 of each arm module 48 are located the controls 133 and 135 which are programmed to control the tilt and spin drive mechanism 110. These programs are initiated by signals generated from the switches 113 when closed by the magnets 115. The generated signals correspond to the binary number which is decoded by the controls 133 and 135 in cabinet 105 to activate the motion programs. The motion programs control the tilt angles and spin speeds, as well as the duration of each, through the motors 114 and 130 as required for the location of the arm module at one of the stations 14–44.

As the arm modules 48 are rotated around the machine 10 from station to station the main console control programmable logic controller 137 must first determine if a glass panel 12 is in place on a module 48 at the respective station in order to coordinate the process timing for peripheral equipment at all stations. This operation of determining the presence of a glass panel is accomplished by the actuation of the pulsed infrared permissive switch 179.

As discussed above, when a glass panel 12 is positioned on an arm module 48 the proximity switch 170, shown in FIG. 6 associated with the holder 148, is actuated to transmit a signal to the controller 131 for tilt and spin drive mechanism 110. A resultant output signal to the switch 179 initiates transmission of a signal from transmitter 181 to receiver 183 for actuating the PLC 137 at the main console 139. Receipt of a signal by the PLC 137 indicates that a particular process is to start at a particular station of the machine 10 because the glass panel 12 is in position at that station.

A return signal is transmitted from transmitter 185 of the PLC to 139 to receiver 187 on the arm module 48. The receiver 187 upon receipt of a return signal from the PLC 137 actuates switches 113 to read the position of the arm module 48 in the screening machine 10. Closing of selected switches 113 generates a binary number to each control 133 and 135 to initiate the required tilt and spin maneuvers to be performed at that specific station.

If a glass panel has not been inserted in the holder 148 of the arm module 48, then the pulsed infrared permissive switch 179 is not actuated. The programmed controls for operation of the tilt and spin drive mechanism are not started. Also with these arrangements all the other operations performed by the peripheral equipment at a station are initiated only upon receipt of signals by the programmable logic controller 137 at the main console 139. The controller 131 is programmed for specific tilt and spin operations at the binary number generated by selective closing of switch 113. Closing of selected switches 113 informs the controller 131 what tilt and spin operations are to be performed at each station 14–44. Thus, the presence of a glass panel 12 in the holder 148 of each arm module 48 is required to initiate commencement of the tilt and spin cycle.

In accordance with the present invention the glass panel 12 is securely positioned on the holder 48 by exerting a vacuum on the exterior face of the glass panel. The vacuum applied against this surface of the glass panel is initiated upon placement of the glass panel in the holder 148, as shown in FIG. 6. The vacuum force is broken as above described to permit removal of the glass panel 12 from the holder 148. Upon reloading an arm module 48 with a glass panel 12 to be treated, the operator inserts the glass in position on the holder 148 and presses against the spring biased rod 158. Depressing the rod 158 initiates the vacuum to retain the glass panel on the holder 148.

Figure 9:
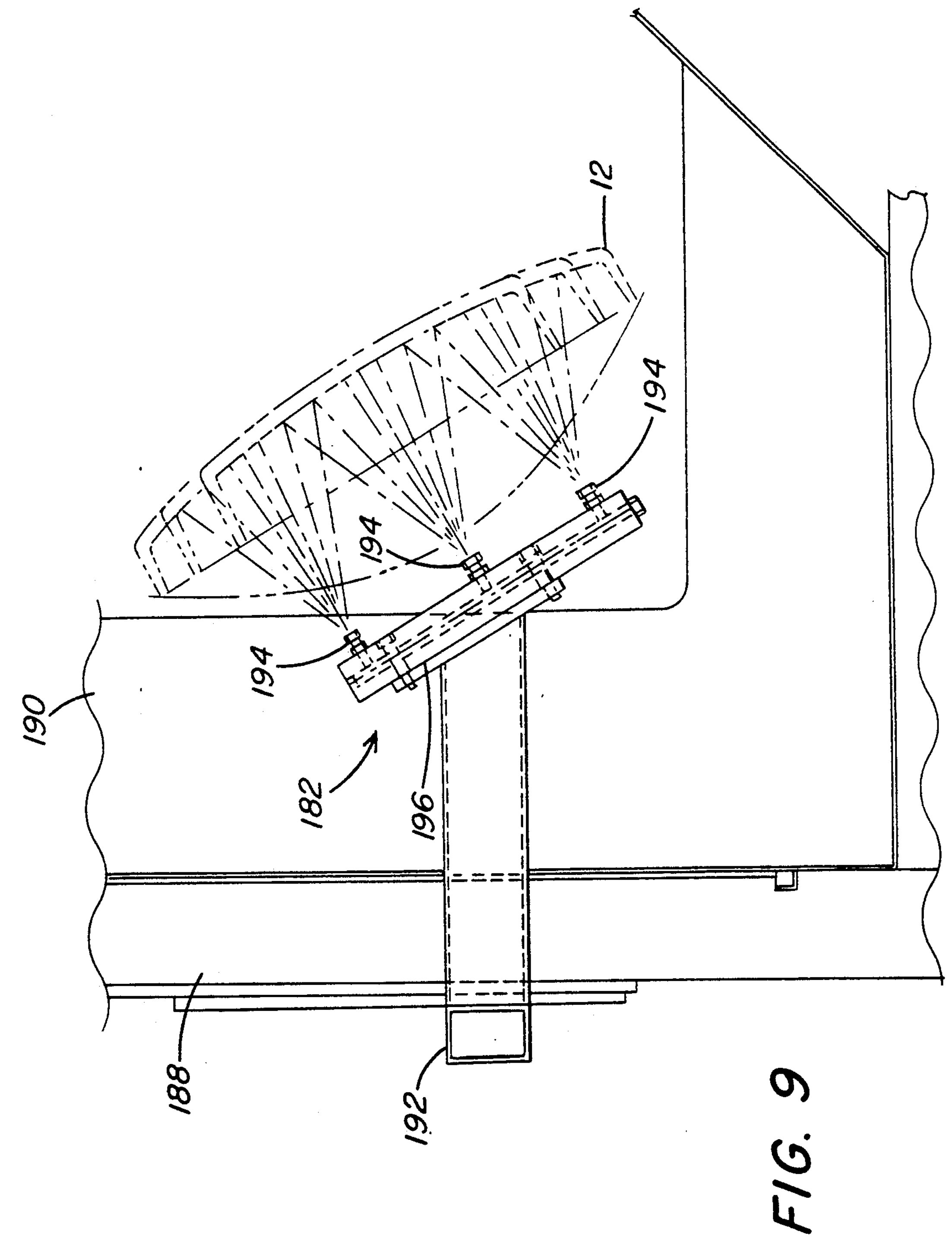
FIG. 9 is an enlarged view in side elevation of a glass panel positioned at a station for applying a deionized (DI) water rinse.

Once a glass panel 12 is loaded onto an arm module 48, for example, in either the first station, station 14, or the eleventh station, station 34, the glass panel is sprayed with a DI water rinse by a jet spray. FIG. 9 illustrates the apparatus at the second station, station 16 as illustrated in FIG. 1, for spraying a DI water rinse by a nozzle assembly generally designated by the numeral 182. A representative station, as illustrated in FIG. 2, includes an upright frame generally designated by the numeral 184. The frame 184 includes brace members 186 and 188. A C-shaped container 190 is bolted to the brace members 186 and 188. A horizontal arm 192 is connected to the C-shaped container 190. The nozzle assembly 182 is mounted at a preselected angle to the end of the horizontal arm 192.

As shown in FIG. 9, the nozzle assembly 182 includes three nozzles 194 positioned in spaced apart relation on a nozzle housing 196 which is bolted to the end of the arm 192. Preferably, as illustrated in FIG. 9, the glass panel 12 is retained in the arm module 48 at an angle of 120° from the initial setup position. Movement of the glass panel to the desired angular position for applying the DI water rinse is controlled by the tilt drive motor 130 illustrated in FIGS. 3 and 4 and programmed for operation as described above. Following the programmed application of the DI water rinse as determined by the PLC 137, the spin drive motor 114 is actuated by the motion programs of the control component 135 of the controller 131 housed within the respective station control cabinet 105 to rotate the glass panel 12 in the angular position of 120° at a preselected rpm, such as 60 rpm for 15 seconds, followed by 100 rpm for 15 seconds.

Following the application of the DI water rinse at station 16, illustrated in FIG. 1, the module supporting the glass panel 12 is advanced on the turntable track 82 to the third station, station 18, illustrated in FIG. 1. Station 18 has a frame construction corresponding to the frame construction illustrated in FIGS. 2 and 9, as described above, where like numerals shown in FIG. 2 and 9 refer to like parts in FIGS. 11 and 12. A spray of the PVA solution is accomplished by application of the solution from a dispenser tube 198 mounted on the end of an arm 200 which is pivotally mounted on a bracket 202. The bracket 202 is connected to a support plate 212 secured vertically to brace member 188.

Figure 12:
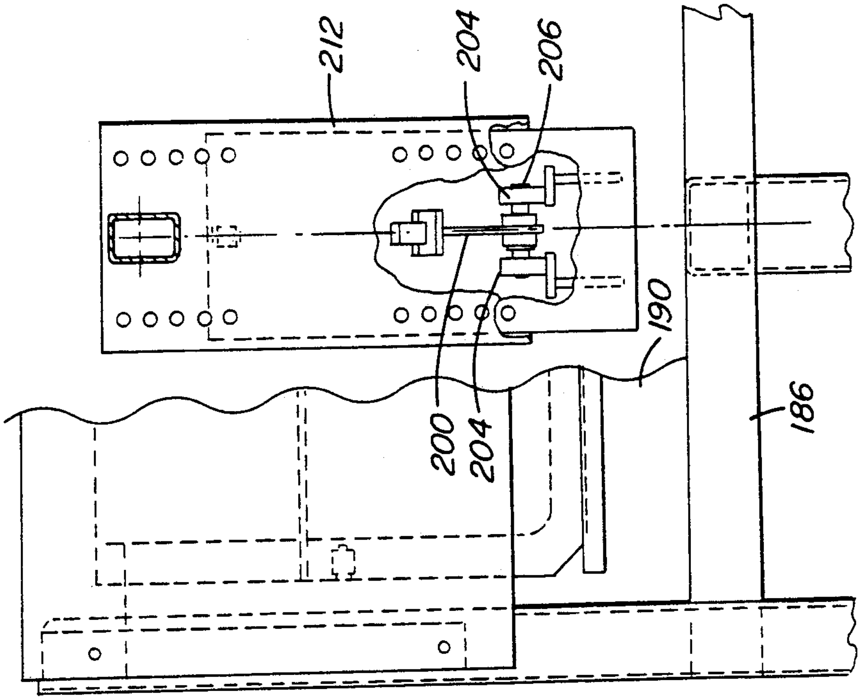
FIG. 12 is a fragmentary end view of the dispensing arm shown in FIG. 11.

As shown in FIG. 12, the bracket 202 supports a pair of bearings 204 that rotatably receive a transverse pin 206 that extends through the intermediate section of the retractable arm 200. At the end of the arm 200 opposite the connection of the dispenser tube 198 to the arm 200, the arm is connected to a piston cylinder assembly 208 which is mounted by a bracket 210 to the support plate 212.

Figure 11:
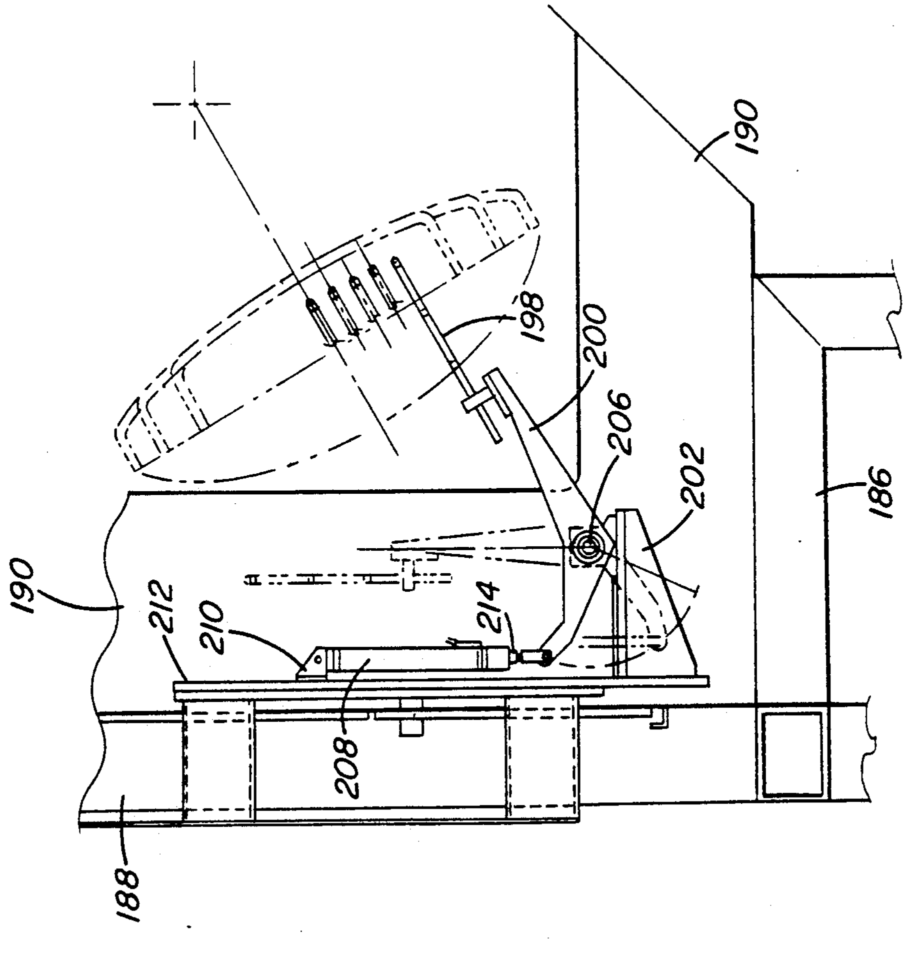
FIG. 11 is an enlarged fragmentary view in side elevation of a dispensing arm for applying polyvinyl acetate (PVA) or phosphor slurry to a glass panel.

The assembly 208 includes a piston cylinder assembly 208 that extends or retracts the piston rod 214, as schematically illustrated in FIG. 11, to pivot the arm 200 about the pivot pin 206 to rotate the dispenser tube 198 from its substantially vertical position to an operative position opposite the glass panel 12 for applying the PVA material to the glass panel 12. The PVA material is supplied from a source through a conduit system, not shown, to the tube 198 which includes a nozzle at the end of the tube.

In a typical application, the glass panel 12 is tilted to an angular position of 120° as shown in FIG. 11, and the retractable arm is pivoted to a preselected position. In this manner, the arm 200 is pivoted to a position where the dispenser tube 198 is directed to the center of the glass panel and is spaced, for example, 20 mm. from the surface of the glass panel 12, where about 60 ml. of PVA material is applied to the glass panel. The glass panel 12, during the application of the PVA material, is rotated at 30 rpm for a time interval of 5 seconds. Then following the application of the PVA material, the glass panel is tilted to an angular position of 100° and spun at a rate of 60 rpm for an interval of 33 seconds. All of these PVA spray operations are performed automatically through operation of the programmable logic controller 137 at the main control console 139.

Following the application of the PVA material at the third station, the arm module 48 is advanced on the turntable in FIG. 1, where the glass panel 12 is subjected to heat for drying the previously applied PVA material. The drying station 20 includes a suitable dryer, such as a quartz heater 216 illustrated in FIG. 10. The quartz heater 216 is conventional in design and therefore its operation will not be described in detail.

Figure 10:
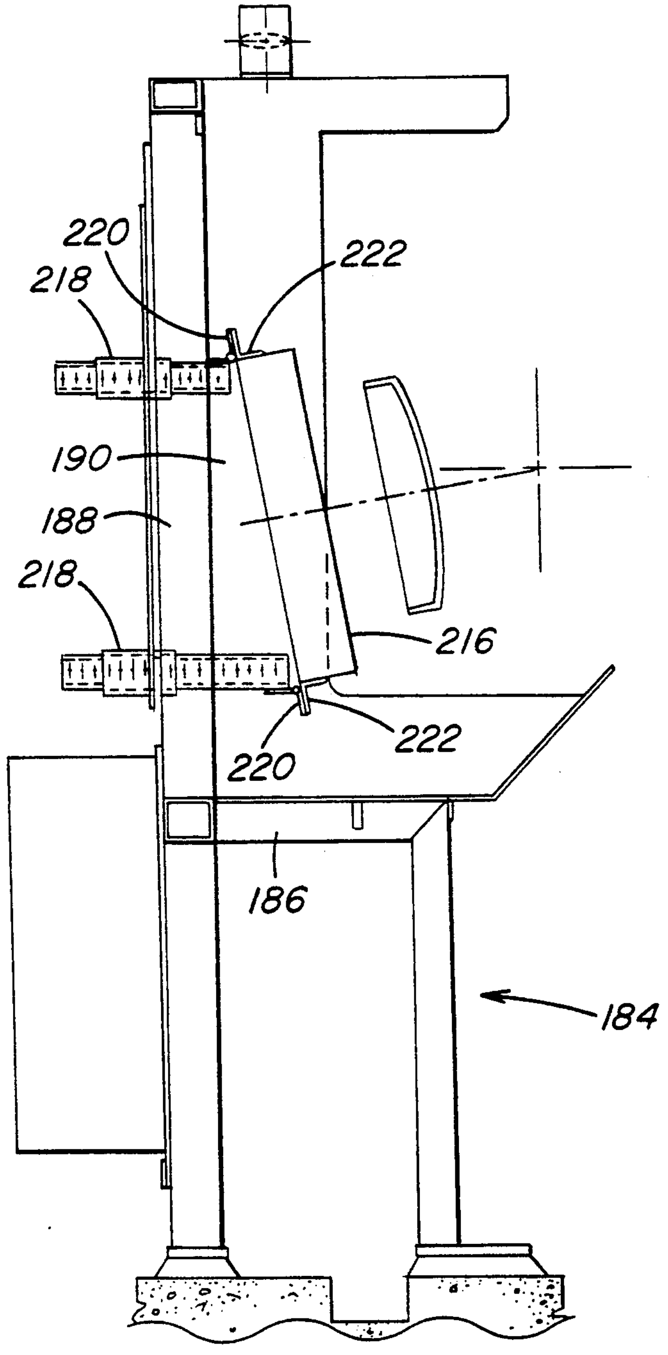
FIG. 10 is an enlarged view in side elevation of a glass panel positioned at a station for radiant heat drying.

The heater 216 is mounted to the upright frame 184 at station 20 in an angular position corresponding to the angular position of the glass panel. A pair of horizontal arm members 218 extend outwardly from the brace member 188, shown in FIG. 10. The arm members 218 are bolted to the brace member 188 at preselected points along the length of the brace member 188 so as to position the heater 216 at a desired angular position relative to the position of the glass panel in the arm module 48. Mounting brackets 220 are secured to the outer ends of the arm members 218 and are bolted to corresponding brackets 222 on the periphery of the heater 216. With this arrangement the quartz heater 216 is operated through the PLC 137 to dry the PVA material at a temperature between about 40°–43° C. During the drying process, the glass panel 12 positioned at a tilt angle of 100° is rotated at 30 rpm for a time interval of 40 seconds, as illustrated in FIG. 10.

The above described spin/dry operation performed at station 20, illustrated in FIG. 1, is also repeated at subsequent stations 28, 32, 40–44 as programmed by the PLC 137. In a specific application the above-described quartz heater 216 is used for drying at stations 20, 28, and 32, shown in FIG. 1. At stations 40–44 cal rod-type heaters are used to effect final drying after the phosphor slurry has been applied to the glass panel and developed at station 36. Cal rod-type heaters are well known in the art and are applicable for use with the present invention. The temperature and interval for heating at the respective stations are controlled by operation of the PLC 137.

After the PVA material is applied to a glass plate 12 at the third station, station 18 illustrated in FIG. 1, the glass panel 12 is dried as above described at the subsequent station, station 20. Following the drying operation, the phosphor slurry is dispensed with a spray apparatus corresponding to the apparatus used to apply the PVA material, as illustrated in FIGS. 11 and 12. At station 22, in a typical application, about 70 ml. of a colored phosphor slurry is applied for a time interval of 8 seconds while the glass panel is rotated at 8 rpm at a tilt angle of 20° on the arm module 48. The time for applying the phosphor slurry is selected for the particular color, red, blue, and green being applied as determined by the program run by the PLC 137 for the respective stations.

Figure 14:
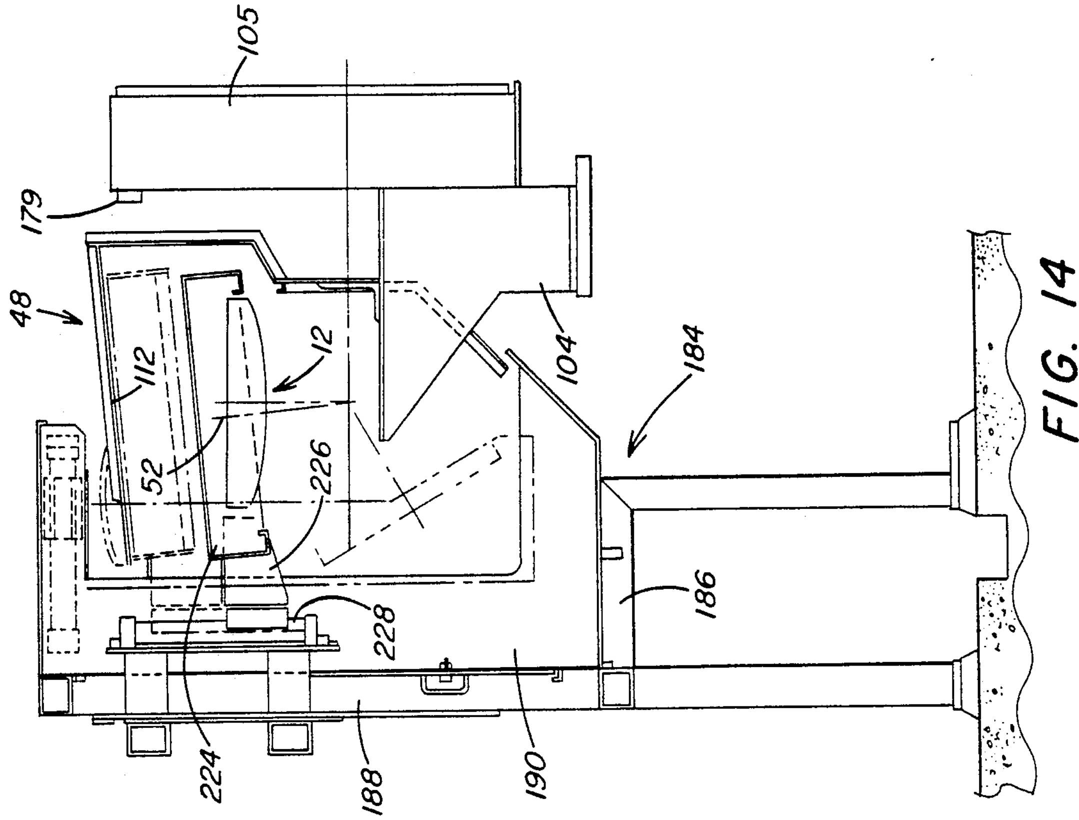
FIG. 14 is a view in side elevation of the reclaim collector shown in FIG. 13.
Figure 13:
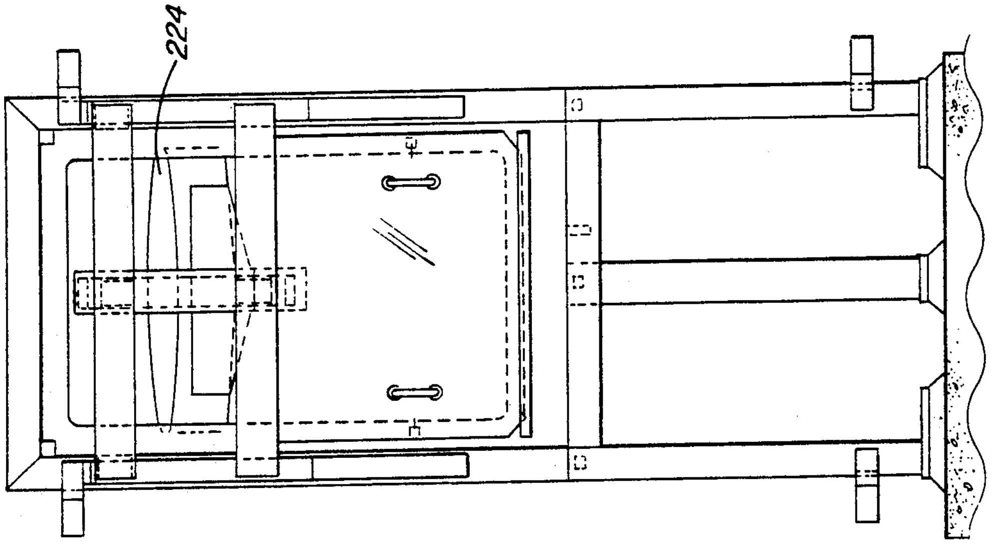
FIG. 13 is a front view of a reclaim collector located at one of the stations of the glass panel screening machine shown in FIG. 1.

Once the phosphor slurry is applied to the glass panel 12, the slurry is spread over the surface of the glass panel at station 24 by rotating the glass panel at a rate of 8 rpm for a time interval of 40 seconds. After the spreading operation the glass panel is advanced to the next station, station 26, where excess slurry is reclaimed by the apparatus illustrated in FIGS. 13 and 14. During the reclaiming operation the glass panel is initially spun for an interval of 5 seconds at 25 rpm. A slurry collector 224 is connected to a bracket 226 which is slidably mounted on a vertical piston 228 connected to the brace member 188 on the upright frame 184.

In the slurry collection operation the collector 224 is lowered over the glass panel 12 which is then spun at a rate of 250 rpm for 10 seconds. Thereafter the collector 224 is retracted as the glass panel is spun for 2 seconds at 15 rpm in a slow-down phase of the process. During the collection process the glass panel 12 is tilted to an angular position of 0°. Finally the glass panel is tilted to a position of 100° where it is spun for 13 seconds at 15 rpm to complete the excess slurry collection process.

Upon completion of the slurry collection process, the glass panel 12 is advanced to station 26 where additional spinning and drying is accomplished, thereafter followed by a washing operation utilizing DI water with the apparatus described above and illustrated in FIG. 9. Thereafter additional washing/drying is performed at station 30 followed by additional drying at station 32. The mask is inserted in the glass panel and unloaded at station 34 for light house exposure in the conventional fashion. An exposed glass panel is loaded at station 34, and development of the applied phosphor slurry is performed at station 36. During the development stage the glass panel is rotated at 15 rpm for 35 seconds at an angular position of 120°. Once the exposed slurry is developed the glass panel is transferred to station 38 where it is rinsed and spun. Thereafter further spin and dry operations are performed at subsequent stations 40, 42, and 44.

Each of the above operations performed at the sixteen stations is repeated for the application of each of the pixel colors red, blue and green on separate screening machines 10. This is followed by application of the black matrix to complete the screening process.

According to the provisions of the patent statutes, we have explained the principle, preferred construction and mode of operation of our invention and have illustrated and described what we now consider to represent its best embodiment. However, it should be understood that the invention may be practiced within the scope of the appended claims, otherwise as specifically illustrated and described.

We claim:

1. Apparatus for handling a glass panel in a process for fabricating a cathode ray tube comprising, a circular track, a plurality of stations positioned in fixed spaced apart relation around said circular track for sequentially performing selected operations on a glass panel in the process of fabricating a cathode ray tube, conveyor means supported by said circular track for sequentially advancing the glass panel from station to station, ' a module fixedly mounted on said conveyor means oppositely of each of said stations to position a plurality of said modules in spaced relation one from another on said conveyor means around said track, drive means connected to said conveyor means for advancing and stopping said conveyor means to move said modules in timed relation step-by-step from one of said stations to the next adjacent one of said stations, holding means for engaging and disengaging the glass panel on said module, tilt and spin drive means mounted on said module and connected to said holding means for moving said holding means to position the glass panel at a preselected angle and rotate the glass panel at a preselected speed and interval of time at said station, said tilt and spin drive means being movable with said module from station to station, and sensing means positioned on said module for detecting the presence of the glass panel on said holding means to initiate actuation of said tilt and spin drive means for selective angular positioning of the glass panel for rotation at a preselected speed and time interval.

2. Apparatus as set forth in claim 1 which includes, a vacuum system connected in fluid communication with said holding means for applying a vacuum to the glass panel when in position on said holding means, and said vacuum system being responsive to said sensing means such that upon detection of the glass panel on said holding means said vacuum system is actuated to apply a vacuum force on the glass panel to secure the glass panel to said holding means.

3. Apparatus as set forth in claim 2 which includes, means for interrupting the vacuum force applied to the glass panel on said holding means to release the glass panel from engagement with said holding means.

4. Apparatus as set forth in claim 1 which includes, a shaft connected to said holding means and extending rearwardly from the glass panel, said shaft having a longitudinal axis movably supported on said module, said shaft drivingly connected to said tilt and spin drive means, and said shaft positioned in contact with said sensing means and being longitudinally displaced when the glass panel is inserted in said holding means to actuate said sensing means to initiate actuation of said tilt and spin drive means to tilt and spin the glass panel about said shaft longitudinal axis.

5. Apparatus as set forth in claim 1 which includes, a tilt axis extending through said holding means and said tilt and spin drive means, a housing for supporting said tilt and spin drive means on said module, said housing connected to said holding means with said tilt axis extending through said housing, a tilt drive motor mounted on said housing, and gear means drivingly connected to said tilt drive motor and said housing for converting rotational movement generated by said tilt drive motor to tilting movement of said housing about said tilt axis to move said housing means to a preselected tilt angle on said module.

6. Apparatus as set forth in claim 1 which includes, a driven shaft connected to said holding means, said driven shaft having a rotational axis with the glass panel being supported for rotation at a preselected speed about said rotational axis, means for nonrotatably connecting said driven shaft to said tilt and spin drive means, a motor mounted on said module, and gear means for drivingly connecting said motor to said tilt and spin drive means to generate rotation of said driven shaft and the glass panel about said rotational axis.

7. Apparatus as set forth in claim 6 which includes, a switch positioned between said driven shaft and said sensing means, said switch being normally maintained in an open position interrupting actuation of said motor, and said switch moved to a closed position in response to placement of the glass panel on said holding means to actuate said sensing means to initiate actuation of said motor and generate rotation of said driven shaft through said tilt and spin drive means.

8. Apparatus as set forth in claim 6 which includes, housing means for supporting said driven shaft on said module for tilting movement of said rotational axis, and a tilt drive motor connected to said housing means for generating movement of said housing means to move said driven shaft to locate said rotational axis at a preselected tilt angle on said module.

9. Apparatus as set forth in claim 1 which includes, a normally open proximity switch having a first component mounted at each station and a second component mounted on said module, said proximity switch second component electrically connected between said sensing means and said tilt and spin drive means, control means for activating said proximity switch second component in response to said sensing means detecting the glass panel on said holding means, and said proximity switch moved to a closed position upon activation of said second component and movement of said module to position said activated second component in a preselected position with respect to said proximity switch first component at said station to initiate actuation of said tilt and spin drive means.

10. Apparatus as set forth in claim 1 which includes, proximity detector means for indicating the presence of said module containing the glass panel at selected ones of said stations, and said tilt and spin drive means being electrically connected to said proximity detection means such that actuation of said tilt and spin drive means is dependent on the detection of the glass panel at said station by said proximity detector means.

11. Apparatus as set forth in claim 10 which includes, said sensing means being electrically connected to said proximity detector means to generate an output signal in response to the presence of the glass panel in said holding means and actuate said proximity detector means to operate said tilt and spin drive means.

12. Apparatus as set forth in claim 1 which includes, a switch mechanism having a first component mounted on said module and a second component removed from said module, programmable controller means electrically connected to said second component for programming the desired rotation and angular positioning of the glass panel on said module, and said sensing means in response to the presence of the glass panel on said holding means being operable to actuate said switch mechanism to transmit a signal from said first component to said second component to actuate said controller means to initiate the desired tilt and spin maneuvers programmed by said controller means for said module.

13. Apparatus as set forth in claim 1 which includes, a control switch including a plurality of individual switches positioned in an array on said module and a plurality of magnets positioned in a corresponding array on each of said stations, said individual switches being positioned oppositely of said corresponding magnets when said module is positioned at said station, means for activating selected ones of said individual switches in said array on said module to respond to said magnets at said station as determined by the desired tilt and spin maneuvers to be performed at said station, a controller mounted on said module and connected to each of said individual switches, said controller being connected to said tilt and spin drive means for actuating said drive means to position the glass panel at said preselected angle and rotate the glass panel at said preselected speed and interval of time at said station, and said controller being actuated upon activation of selected ones of said individual switches to respond to the oppositely positioned magnets and generate a coded signal to said controller to initiate the desired tilt and spin maneuvers.

14. A method for advancing a glass panel from station to station around a circular track in a process for making cathode ray tubes comprising the steps of, positioning a glass panel for rotational and angular movement on a module, advancing the module in timed relationship from station to station around a circular track for processing the glass panel at each of a plurality of stations, detecting the presence of a module at each station, transmitting an electrical signal to a controller in response to the presence of the module at each station, identifying at the controller the station corresponding to the electrical signal for performing a preselected operation on the panel, transmitting a return signal to the module corresponding to the preselected operation to be performed on the glass panel at the station, actuating a drive mechanism on the module to generate tilt and rotation maneuvers required to be performed at the station, and thereafter tilting the glass panel on the module to a preselected angle and rotating the glass panel at a preselected speed for a desired time interval corresponding to the selected operation performed on the glass panel at the station.

15. A method as set forth in claim 14 which includes, positioning the glass panel on a holder supported for rotational and angular movement on the module, creating a vacuum force adjacent a surface of the glass panel to retain the glass panel on the holder, generating the vacuum force upon placement of the glass panel on the holder, and actuating the controller to initiate rotational and angular movement of the glass panel in response to the application of the vacuum force on the glass panel.

16. A method as set forth in claim 14 which includes, detecting the presence of the glass panel on the module at each station, generating a signal in response to the presence of the glass panel on the module, receiving the signal indicating the presence of the glass panel on the module at the controller, and actuating the controller in response to the signal indicating the presence of the glass panel to initiate rotational and angular movement of the glass panel on the module.

17. A method as set forth in claim 14 which includes, monitoring the presence of the glass panel on each module as the module is advanced from station to station, detecting the presence of the glass panel on the module at the station, and transmitting a signal to the controller in response to the presence of the glass panel on the module at the station to actuate the controller to identify the preselected operation to be performed on the glass panel at the station.

18. Apparatus for handling a glass panel in a process for fabricating a cathode ray tube comprising, a circular track, a plurality of stations positioned in spaced apart relation around said circular track for sequentially performing selected operations on a glass panel in the process of fabricating a cathode ray tube, conveyor means supported by said circular track for sequentially advancing the glass panel from station to station, a module fixedly mounted on said conveyor means oppositely of each of said stations to position a plurality of said modules in spaced relation one from another on said conveyor means around said track, drive means connected to said conveyor means for advancing and stopping said conveyor means to move said modules in timed relation step-by-step from one of said stations to the next adjacent one of said stations, holding means for engaging and disengaging the glass panel on said module, tilt and spin drive means connected to said holding means for moving said holding means to position the glass panel at a preselected angle and rotate the glass panel at a preselected speed and interval of time at said station, sensing means positioned on said module for detecting the presence of the glass panel on said holding means to initiate actuation of said tilt and spin drive means for selective angular positioning of the glass panel for rotation at a preselected speed and time interval, a shaft connected to said holding means and extending rearwardly from the glass panel, said shaft having a longitudinal axis movably supported on said module, said shaft drivingly connected to said tilt and spin drive means, and said shaft positioned in contact with said sensing means and being longitudinally displaced when the glass panel is inserted in said holding means to actuate said sensing means to initiate actuation of said tilt and spin drive means to tilt and spin the glass panel about said shaft longitudinal axis.

19. Apparatus for handling a glass panel in a process for fabricating a cathode ray tube comprising, a circular track, a plurality of stations positioned in spaced apart relation around said circular track for sequentially performing selected operations on a glass panel in the process of fabricating a cathode ray tube, conveyor means supported by said circular track for sequentially advancing the glass panel from station to station, a module fixedly mounted on said conveyor means oppositely of each of said stations to position a plurality of said modules in spaced relation one from another on said conveyor means around said track, drive means connected to said conveyor means for advancing and stopping said conveyor means to move said modules in timed relation step-by-step from one of said stations to the next adjacent one of said stations, holding means for engaging and disengaging the glass panel on said module, tilt and spin drive means connected to said holding means for moving said holding means to position the glass panel at a preselected angle and rotate the glass panel at a preselected speed and interval of time at said station, sensing means positioned on said module for detecting the presence of the glass panel on said holding means to initiate actuation of said tilt and spin drive means for selective angular positioning of the glass panel for rotation at a preselected speed and time interval, a tilt axis extending through said holding means and said tilt and spin drive means, a housing for supporting said tilt and spin drive means on said module, said housing connected to said holding means with said tilt axis extending through said housing, a tilt drive motor mounted on said housing, and gear means drivingly connected to said tilt drive motor and said housing for converting rotational movement generated by said tilt drive motor to tilting movement of said housing about said tilt axis to move said housing means to a preselected tilt angle on said module.

20. Apparatus for handling a glass panel in a process for fabricating a cathode ray tube comprising, a circular track, a plurality of stations positioned in spaced apart relation around said circular track for sequentially performing selected operations on a glass panel in the process of fabricating a cathode ray tube, conveyor means supported by said circular track for sequentially advancing the glass panel from station to station, a module fixedly mounted on said conveyor means oppositely of each of said stations to position a plurality of said modules in spaced relation one from another on said conveyor means around said track, drive means connected to said conveyor means for advancing and stopping said conveyor means to move said modules in timed relation step-by-step from one of said stations to the next adjacent one of said stations, holding means for engaging and disengaging the glass panel on said module, tilt and spin drive means connected to said holding means for moving said holding means to position the glass panel at a preselected angle and rotate the glass panel at a preselected speed and interval of time at said station, sensing means positioned on said module for detecting the presence of the glass panel on said holding means to initiate actuation of said tilt and spin drive means for selective angular positioning of the glass panel for rotation at a preselected speed and time interval, a driven shaft connected to said holding means, said driven shaft having a rotational axis with the glass panel being supported for rotation at a preselected speed about said rotational axis, means for nonrotatably connecting said driven shaft to said tilt and spin drive means, a motor mounted on said module, and gear means for drivinly connecting said motor to said tilt and spin drive means to generate rotation of said driven shaft and the glass panel about said rotational axis.

* * * * *